3,479,866
HYDROGEN EMBRITTLEMENT TESTING
METHOD AND APPARATUS
Richard C. Movich, North Hollywood, and Ronald L. Topp, Glendale, Calif., assignors to Lockheed Aircraft Corporation, Burbank, Calif.
Filed June 19, 1967, Ser. No. 647,044
Int. Cl. G01n 3/20, 3/00
U.S. Cl. 73—100
2 Claims

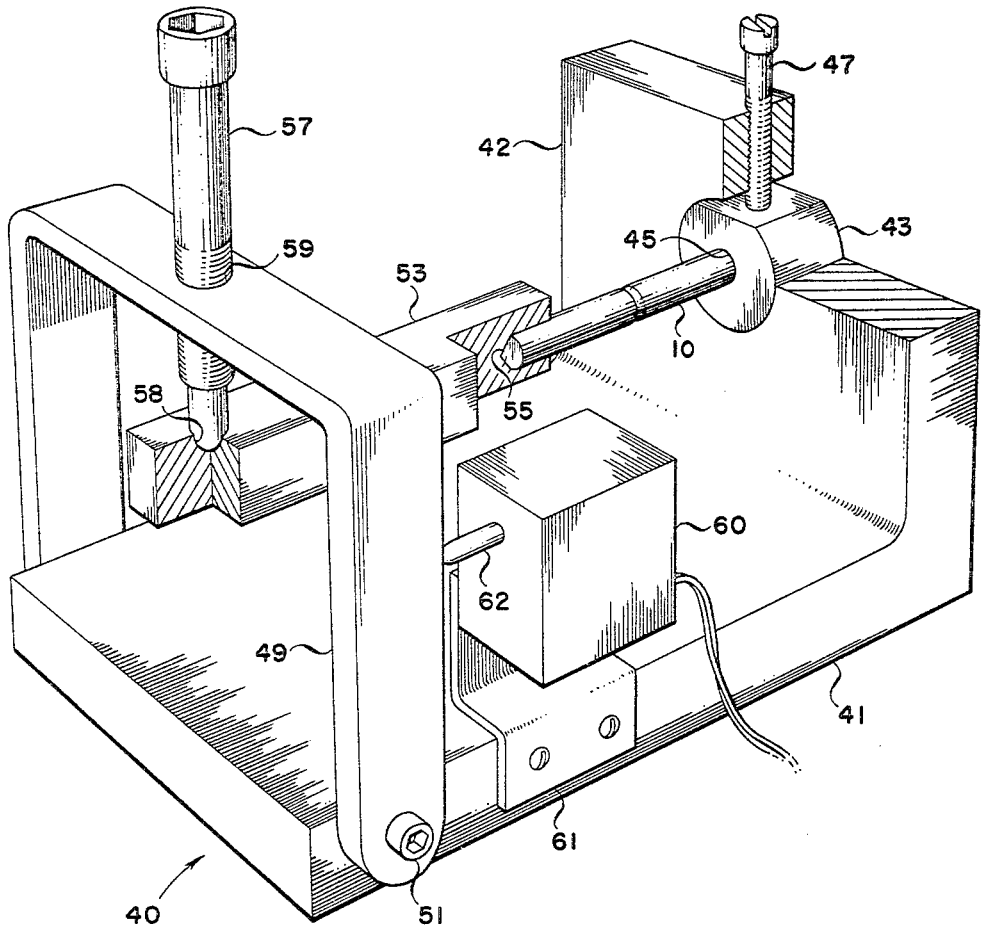

ABSTRACT OF THE DISCLOSURE

A testing process and apparatus for determining whether or not high strength steel parts are embrittled by hydrogen. In such a process a notched coupon, which is fabricated from the same material and heat treated under identical conditions as the steel parts, is retained in a frame in cantilevered position and subjected to a constant bending moment by the apparatus for a specific period of time. If the coupon has been embrittled by hydrogen it will fracture under the constant load.

CROSS REFERENCE TO A RELATED APPLICATION

The notched coupon and its method of fabrication used in the hydrogen embrittlement testing process are described in our co-pending patent application, Ser. No. 645,934, filed June 14, 1967, entitled "Hydrogen Embrittlement Testing Coupon."

BACKGROUND OF THS INVENTION AND DESCRIPTION OF THE PRIOR ART

This invention relates to apparatus for testing for hydrogen embrittlement of high strength steel. More particularly, it is directed to a process which subjects a notched coupon to a constant bending load for a specified period of time.

Hydrogen embrittlement is a phenomenon whereby monatomic hydrogen is introduced into a high strength steel when the steel comes into contact with solutions containing hydrogen, thereby causing the steel to embrittle. This usually occurs during the cleaning, pickling or plating operations of the steel part. In spite of the many investigations of hydrogen embrittlement and delayed brittle fracture reported in technical literature, there is still no general agreement regarding the mechanism by which hydrogen reduces the ductility of steel.

Hydrogen embrittlement is only evidenced when the high strength steel is subjected to static loading for periods of time of sufficient duration to cause dissolved hydrogen to diffuse to any areas of triaxial stress (such as notches, cracks, etc.) and to reach a critical concentration which results in failure of the structure. The embrittlement usually occurs in such triaxial stress areas because in those regions the stress reaches its maximum and the hydrogen exerts a maximum embrittling effect. Because of this phenomenon, special procedures have been established for cleaning and plating the steel to insure freedom from hydrogen absorption which could cause embrittlement and failure of parts during service.

Sustained loading of an annularly notched coupon has been generally accepted as the best method for hydrogen embrittlement testing. The notched coupon is loaded at some stress level below its ultimate strentgh for a specified period of time, usually 200 hours. If the coupon is free from embrittlement, it will not fracture under a sustained load. Conversely, if the coupon has been embrittled by hydrogen, it will fracture under a sustained load.

For accurate results, the notched coupons used for hydrogen embrittlement testing are fabricated from the same alloy and heat treated to the same ultimate tensile strength as the parts which are being cleaned or plated.

Heretofore the standard method of subjecting a notched tensile coupon to a sustained load has been to load the coupon in tension using a stress-rupture machine. This machine subjected the coupon to any predetermined constant uniaxial tensile load. A timer connected to the machine measured the time to failure under sustained load. The salient disadvantages of using the stress-rupture machine for hydrogen embrittlement testing have been the high cost of the machine and the necessity for a coupon with threads or shoulders for gripping. The cost of the machine is an important consideration since a single coupon may be under test for eight days.

In order to overcome the high cost of a stress-rupture machine, tension rings have been used extensively for hydrogen embrittlement testing. This device consisted of an 8 inch diameter steel ring with grips which provided a means for applying a tensile load to the notched coupon. The load was applied by tightening a nut which was attached to the grips while measuring the deflection of the ring with a dial indicator. The rings were calibrated by measuring deflection versus load using a universal testing machine.

The disadvantage of such tension rings for hydrogen embrittlement testing is the difficulty in obtaining a purely uniaxial load with no bending. This difficulty produced varying degrees of eccentric loading that lead to erroneous excessive stress levels at the notch, which were not predictable. The added stresses due to this bending then caused a premature failure of the test coupon and produced a great deal of scatter in test results. For this reason, it has been difficult to establish whether or not hydrogen embrittlement was present or to what extent. Othere disadvantages were the difficulty of loading the device and the necessity for the test coupon to have threads or shoulders for engaging the steel grips of the ring.

SUMMARY OF THE INVENTION

This invention describes a process and apparatus for use in hydrogen embrittlement testing of high strength steel parts. The process utilizes a test coupon which is fabricated from the same material and heat treated under identical conditions as the steel parts. In this process the test coupon is subjected to a constant bending load for a specified period of time. The bending load is a specific percentage of that load which is required to fracture a coupon that is free from hydrogen embrittlement.

BRIEF DESCRIPTION OF THE DRAWING

The figure is an isometric view, partly in section, of the testing apparatus with the coupon installed therein.

DESCRIPTION OF THE PREFERRED EMBODIMENT

The drawing shows the preferred embodiment of the test apparatus 40 with a notched coupon 10 installed therein. The test apparatus 40 includes a base 41. Located on one end of the base 41 is a vertical leg 42 into which a plug 43 is adapted to be inserted. The plug 43 is secured to the leg 42 by means of a screw 47. The plug 43 is provided with a bore 45, which is adapted to receive one end of the coupon 10, to hold the coupon in a cantilevered position. A loading beam 53 is provided with a bore 55 for receiving the free end of the coupon 10, the other end of the beam 53 being provided with a bore 58.

Located on the other end of the base 41 is a loading yoke 49 which is pivotally connected to the base 41 at the axis 51. The loading yoke 49 has a bore 59 into which a load screw 57 is threadedly engaged. The lower end of the load screw 57 is adapted to be inserted into the bore 58 of the loading beam 53.

A microswitch 60, or other suitable switch means, is also located on the base 41 and is mounted thereon by a bracket 61. The microswitch 60 includes a plunger 62 which contacts the yoke 49 and is activated when the yoke 49 is in its upright or loaded position as shown in the figure. The plunger 62 is spring loaded when in that position. The microswitch in turn is electronically connected to a timer (not shown) by recording purposes.

The device is calibrated using a universal testing machine by measuring load versus deflection of the loading beam at the point at which the load is applied. This relationship of load versus deflection is translated to load versus turns of the screw for ease of loading.

In operation the apparatus is loaded by inserting the coupon 10 into the bore 45 of the plug 43 and slipping the bore 55 of the loading beam 53 over the coupon. The loading yoke 49 is then moved to an upright position and the loading screw 57 is screwed down into engagement with the bore 58 of the loading beam 53. The loading screw 57 is turned until it initially touches the base of the bore 58, which is the zero position. Then a predetermined load is applied by turning the screw, with a socket wrench, the proper number of turns. The predetermined load is a specific percentage of that load which is required to fracture a coupon that is free from hydrogen embrittlement. For example, if it has been found that the ultimate strength of a coupon that is free from hydrogen embrittlement is 13.2 turns of the screw 57 from the zero position with a thread pitch of 20 threads per inch and a moment arm of five inches. Then the predetermined load would be a certain percentage of 13.2 turns. For standardization, it would be recommended that 75 percent of the ultimate load be used. It should also be understood, that the distance from the notch of the coupon to the bore 58 of the beam 53 should be uniform, as with the bending length of the coupon to insure a uniform bending moment. With such a standardization, more meaningful test results can be obtained.

Upon loading, the microswitch plunger 62 contacts the loading yoke 49, thus closing the microswitch 60, activating the timer. The load is then sustained for a specific amount of time. If the coupon fractures due to hydrogen embrittlement the loading beam 53 falls and the loading yoke 49 is free to pivot away from the microswitch 60 because of the spring loaded force of the plunger 62. This action disengages the microswitch plunger 62 and opens the switch 60, which in turn stops the timer. The amount of the load and the period of time over which the load has acted on the coupon 10 are then recorded.

Therefore, this method of detecting hydrogen embrittlement in high strength steel parts comprises the steps of retaining a notched coupon in a cantilevered position and subjecting the notched coupon to a sustained bending load of a predetermined value. If the coupon is not embrittled by hydrogen it will not fracture. However, if the coupon is embrittled by hydrogen, it does fracture at the groove region. After each test run the load value and the duration of the applied loading are recorded.

With such a method, it has been found that the scattering of test results has been sharply reduced. By using a constant bending moment there is only one type of loading, i.e., pure bending, which accounts for the high repeatability.

This method of hydrogen embrittlement testing overcomes the difficulties found with presently employed testing devices and coupons. Since the coupon is not loaded in tension, threads or shoulder for gripping are not necessary, and the coupon is easily insertable into the device for loading. The cost of the testing device is considerably less than that of a tension ring. A pure bending load is applied to the coupon with inherent reproducibility as contrasted to the uncertainty of obtaining a pure uniaxial load with a tension ring. Use of a bending moment eliminates the problem of unknown stresses due to eccentricity while retaining the ability to apply a maximum tensile stress at the base of the notch.

Finally, due to the mechanical advantage gained by the utilization of a bending moment, the load required is only a fraction of that required when loading a tension ring, which must load the coupon in tension.

It will be understood that various changes in the details, materials, steps and arrangements of parts, such as in applying the bending moment or recording the test duration, are herein described and illustrated to explain the nature of the invention, may be made by those skilled in the art within the principle and scope of the invention, as expressed in the appended claims.

We claim:

1. An apparatus for detecting hydrogen embrittlement in high strength steel parts comprising:
   a first member;
   retaining means located on said first member for holding one end of a notched coupon;
   a loading yoke pivotally mounted to said first member;
   a loading screw being threadedly mounted in the loading yoke for linear displacement therewith for applying the sustained load to the other end of the coupon; and
   a switch member located on said first member, said switch member including plunger means for engaging said loading yoke and for activating said switch upon movement of said yoke due to fracture of the notched coupon from the sustained load.

2. Testing apparatus for applying a bending load to a cylindrical test coupon, comprising:
   a base member having a horizontally disposed floor portion and a vertically extending wall portion including an aperture disposed in said wall portion for receiving one end of said coupon;
   a cantilevered loading beam having a cylindrical bore in the restrained end thereof, for receiving the other end of said coupon, and an indexing depression adjacent the free end thereof normal to the axis of said cylindrical bore;
   a loading yoke pivotally mounted to said floor portion and positionable over said free end of said loading beam; and,
   a load screw threadedly mounted in said yoke and having a dependent end engageable with said indexing depression so as to impose a selected bending load on said coupon via said cantilevered loading beam in response to axial displacement of said load screw in a direction towards said loading beam.

References Cited

UNITED STATES PATENTS 1,356,821 10/1920 Humfrey _____ 73—100
2,645,937 7/1953 Skalmusky et al. _____ 73—94

RICHARD C. QUEISSER, Primary Examiner

C. E. SNEE, Assistant Examiner

U.S. Cl. X.R.

73—88, 90, 103